(12) United States Patent
Chang (10) Patent No.: US 7,755,860 B2
(45) Date of Patent: Jul. 13, 2010

(54) PRISM SHEET

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/251,394

(22) Filed: Oct. 14, 2008

(65) Prior Publication Data

US 2009/0244739 A1   Oct. 1, 2009

(30) Foreign Application Priority Data

Mar. 28, 2008   (CN) .................. 2008 1 0300764

(51) Int. Cl.
*G02B 5/04* (2006.01)

(52) U.S. Cl. ...................................... 359/834

(58) Field of Classification Search ......... 359/831–837; 362/246; 349/64
See application file for complete search history.

(56) References Cited

U.S. PATENT DOCUMENTS

| 4,576,850 | A  | * | 3/1986 | Martens ........................ 428/156 |
| 2008/0130113 | A1 | * | 6/2008 | Hsu et al. ..................... 359/831 |
| 2008/0130117 | A1 | * | 6/2008 | Hsu et al. ..................... 359/599 |

* cited by examiner

*Primary Examiner*—Euncha P Cherry
(74) *Attorney, Agent, or Firm*—Clifford O. Chi (57) ABSTRACT

An exemplary prism sheet includes a first surface and a second surface opposite the first surface. The first surface defines a plurality of elongated V-shaped grooves, and the elongated V-shaped grooves are parallel to each other. The second surface defines a plurality of parallelogram microstructures. Each parallelogram microstructure defines four adjacent triangular pyramid depressions.

12 Claims, 10 Drawing Sheets

PRISM SHEET

CROSS-REFERENCE TO RELATED APPLICATIONS

This application is related to two co-pending U.S. patent application Ser. No. 12/186,529, filed on Aug. 6, 2008, and entitled "PRISM SHEET", and Ser. No. 12/195,444, filed on Aug. 21, 2008, and entitled "PRISM SHEET". The inventor of the co-pending applications is Shao-Han Chang. The co-pending applications have the same assignee as the present application. The Specification and Drawings of the co-pending applications are incorporated in their entirety herein by reference.

BACKGROUND OF THE INVENTION

1. Field of the Invention

The present invention relates to a prism sheet employed in a backlight module.

2. Description of the Related Art

Figure 9:
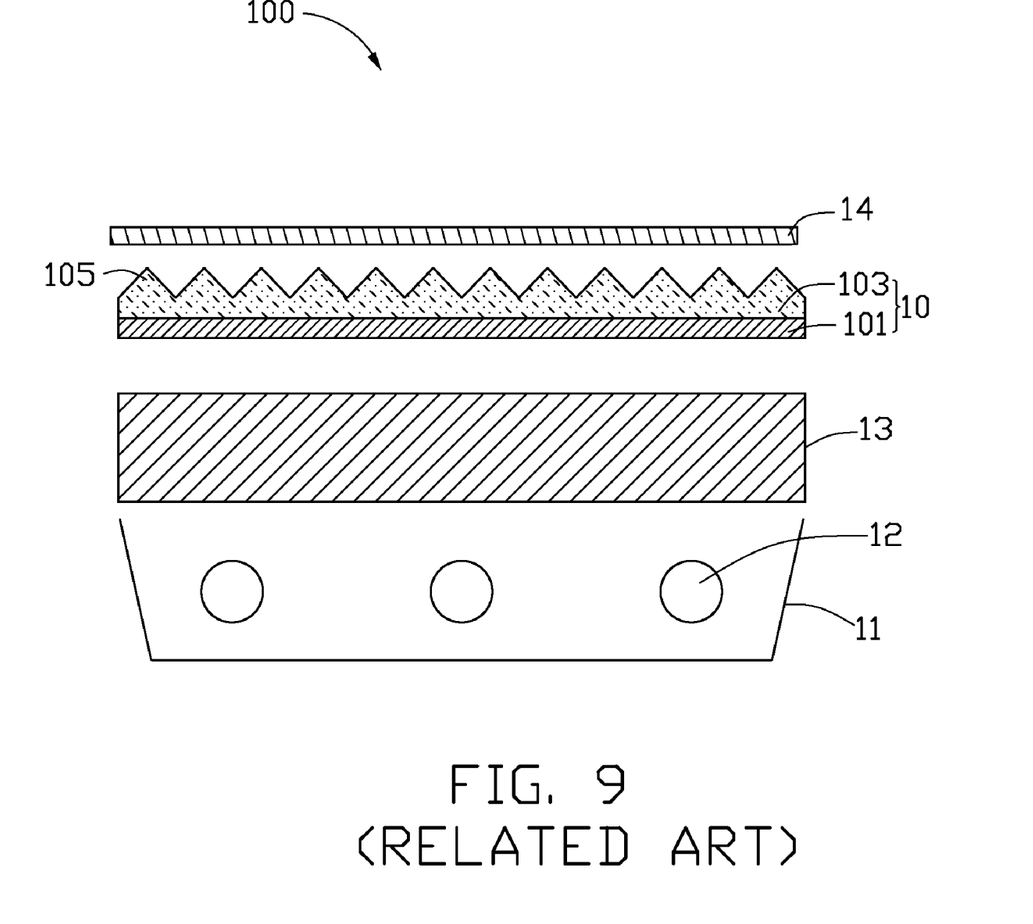
FIG. 9 is a side cross-sectional view of a typical backlight module including a typical prism sheet.
Figure 10:
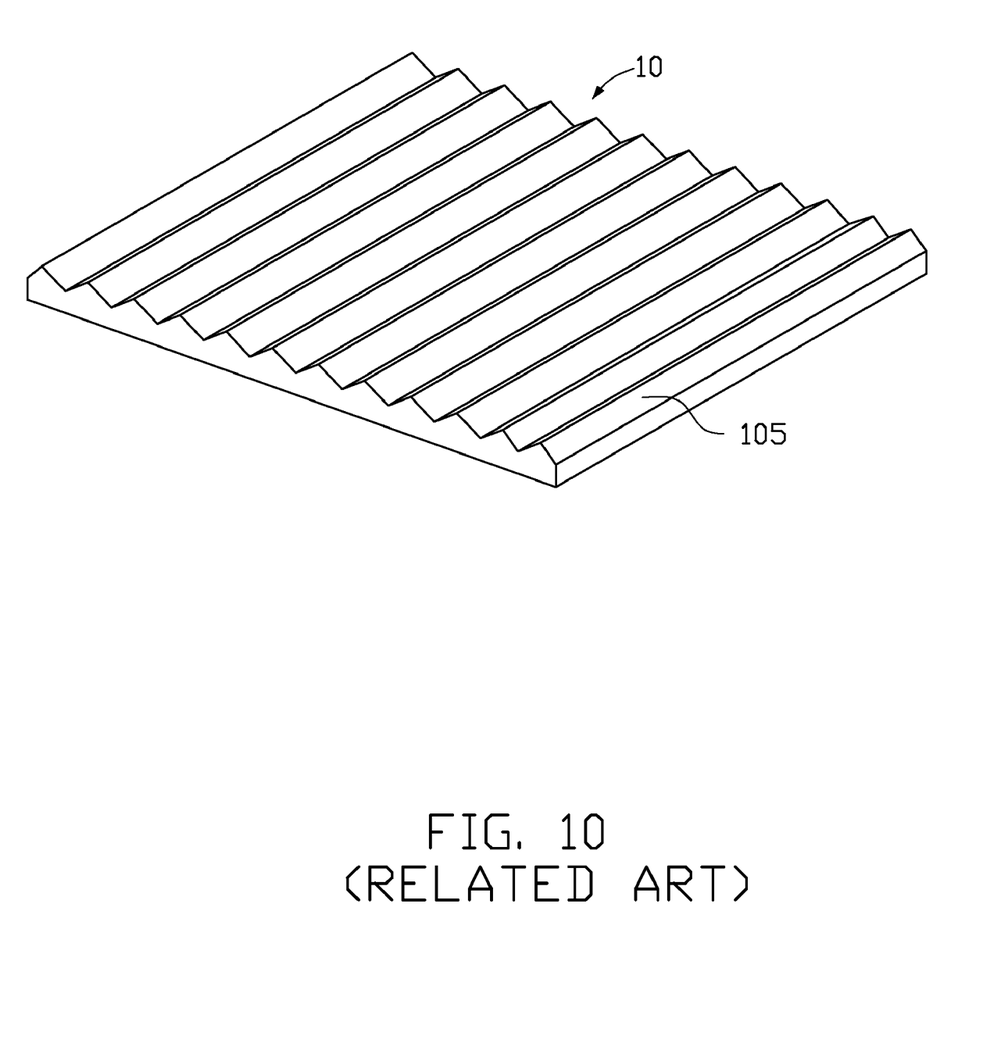
FIG. 10 is an isometric view of the typical prism sheet of the backlight module of FIG. 9.

Referring to FIGS. 9 and 10, a typical direct type backlight module 100 includes a frame 11, a plurality of light sources 12, a light diffusion plate 13, and a typical prism sheet 10. The light sources 12 are positioned in an inner side of the frame 11. The light diffusion plate 13 and the typical prism sheet 10 are positioned on the light sources 12 above a top of the frame 11. The light diffusion plate 13 includes a plurality of diffusing particles (not shown) configured for diffusing light. The typical prism sheet 10 includes a transparent substrate 101 and a prism layer 103 formed on a surface of the transparent substrate 101. A plurality of elongated V-shaped ridges 105 is formed on the prism layer 103.

In use, light emitted from the light sources 12 enters the diffusion plate 13 and becomes scattered. The scattered light leaves the diffusion plate 13, travels through the typical prism sheet 10, and is refracted out at the elongated V-shaped ridges 105.

The refracted light leaving the typical prism sheet 10 is concentrated at the prism layer 103 and increases the brightness of the prism sheet 10. The refracted light propagates into a liquid crystal display panel (not shown) positioned above the prism sheet 10.

However, although light from the light sources 12 enters the diffusion plate 13 and becomes scattered, the light leaves the prism sheet 10, and forms strong light spots.

In order to reduce or eliminate the strong light spots, the backlight module 100 should further include an upper light diffusion film 14 disposed on the typical prism sheet 10.

However, although the upper light diffusion film 14 and the typical prism sheet 10 are contacting each other, a plurality of air pockets exist around the boundaries of the light diffusion film 14 and the typical prism sheet 10. When light passes through the air pockets, some of the light undergoes total reflection along one or another of the corresponding boundaries. In addition, the upper light diffusion film 14 may absorb a certain amount of the light from the prism sheet 10. As a result, a brightness of light illumination of the backlight module 100 is reduced.

Therefore, a new prism sheet is desired to overcome the above-described shortcomings.

SUMMARY

An exemplary prism sheet includes a first surface and a second surface opposite the first surface. The first surface defines a plurality of elongated V-shaped grooves. The second surface defines a plurality of parallelogram microstructures. Each parallelogram microstructure defines four adjacent triangular pyramid depressions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe various inventive embodiments of the present prism sheet in detail.

Figure 1:
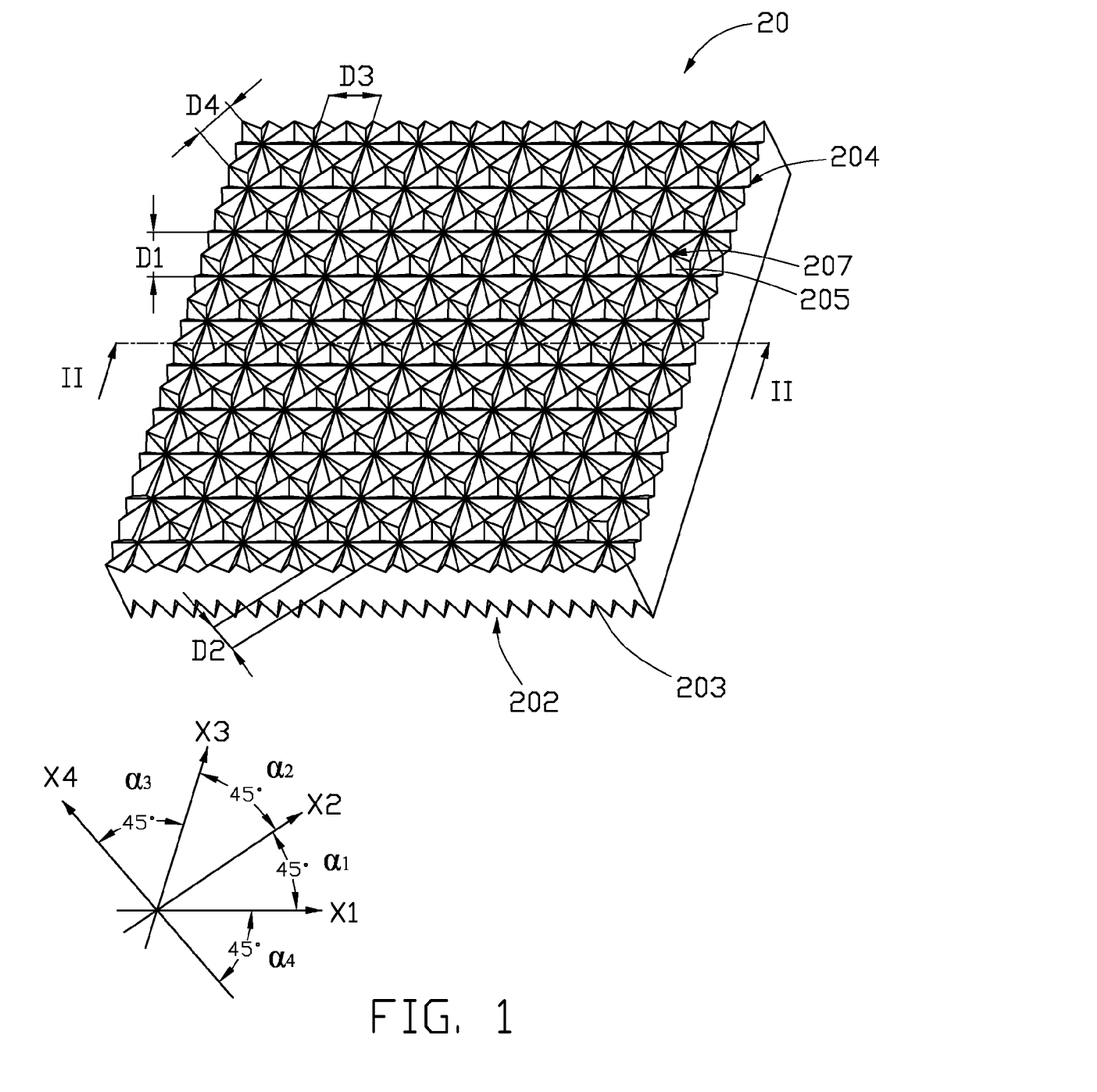
FIG. 1 is a first embodiment of an isometric view of a prism sheet.
Figure 2:
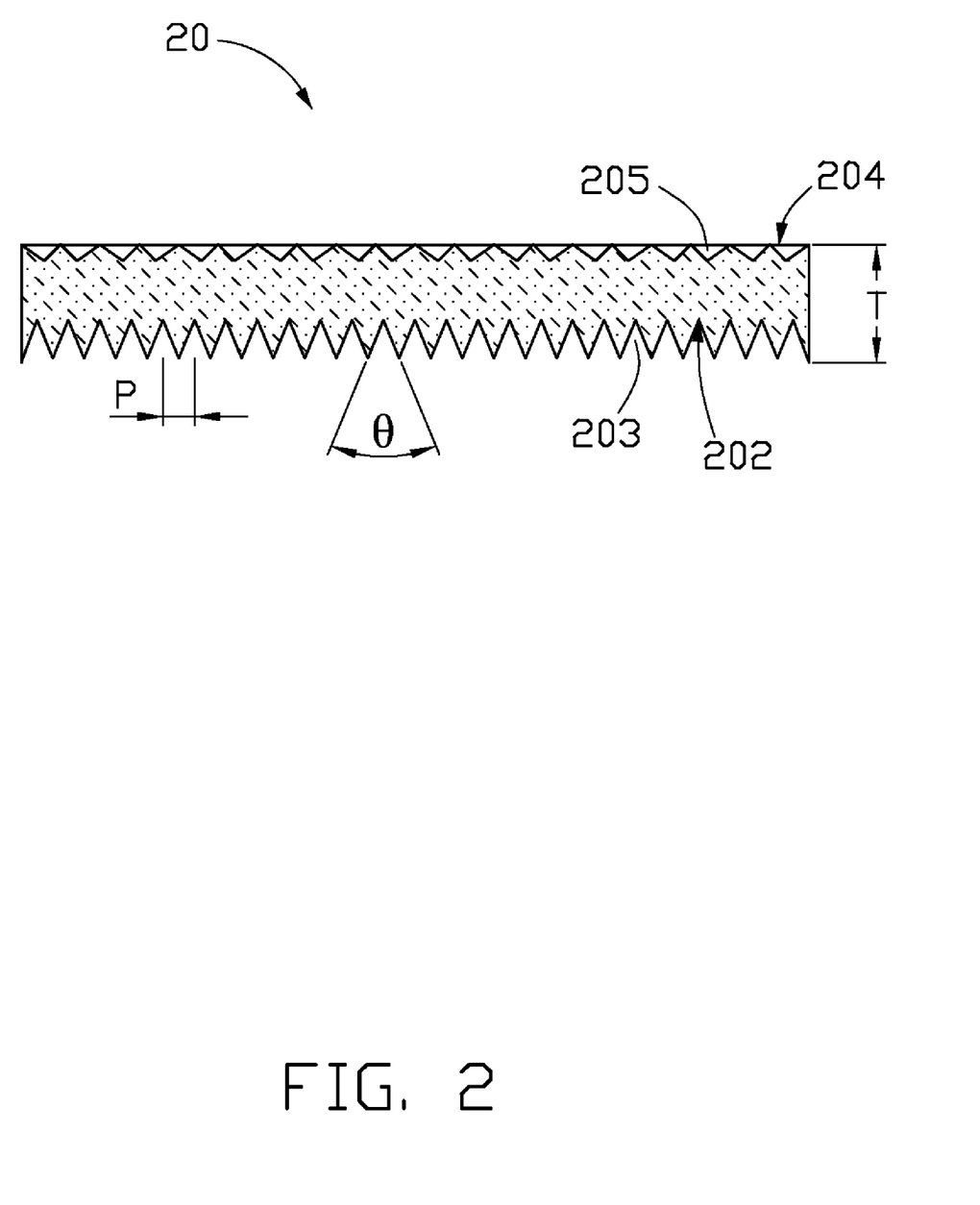
FIG. 2 is a cross-sectional view of the prism sheet of FIG. 1, taken along line 11-11.
Figure 3:
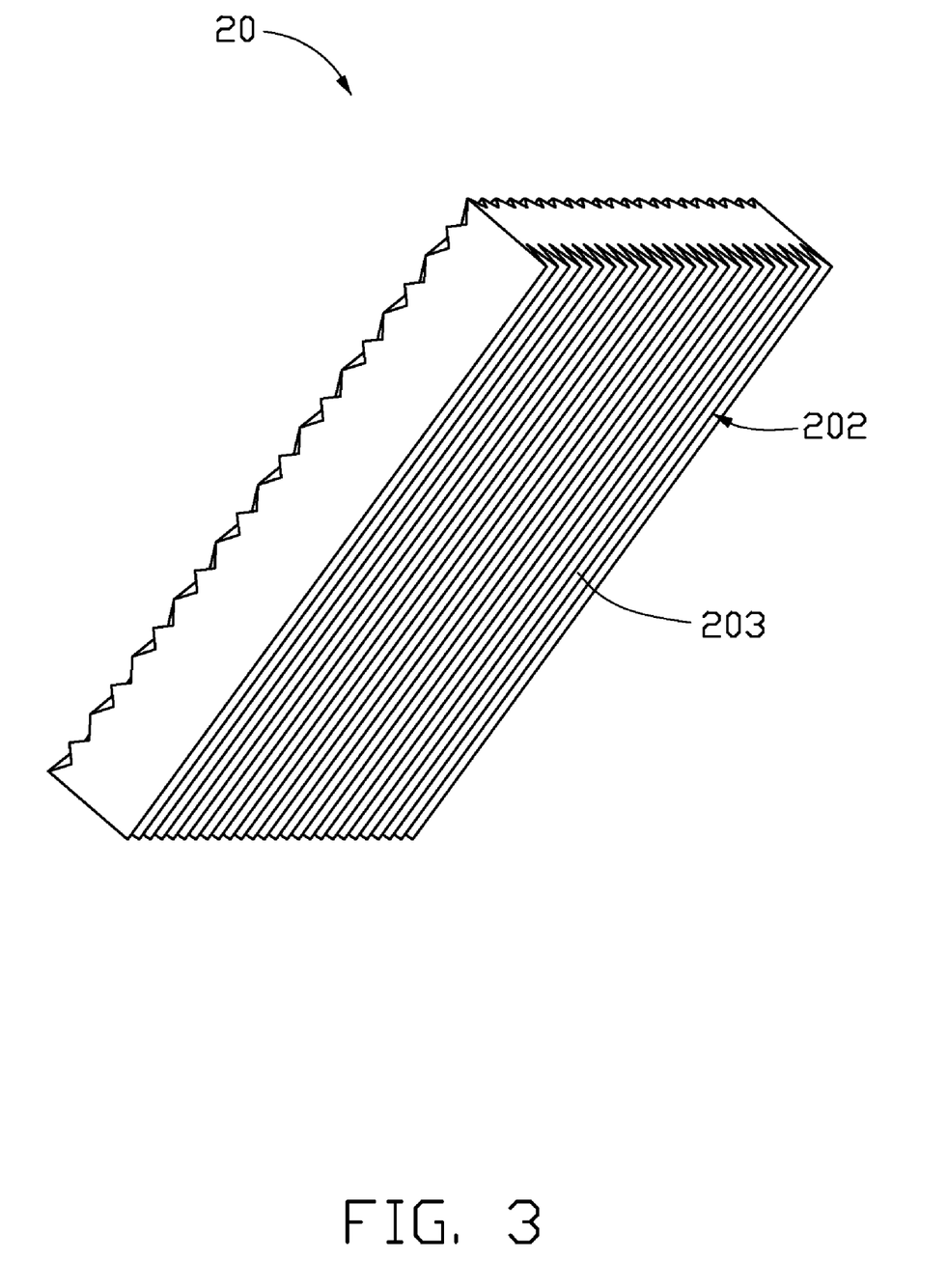
FIG. 3 is similar to FIG. 1, but shown from another aspect.

Referring to FIGS. 1 through 3, in a first embodiment, a prism sheet 20 includes a first surface 202 and a second surface 204 opposite the first surface 202.

A plurality of elongated V-shaped grooves 203 for concentrating light is formed on the first surface 202. The elongated V-shaped grooves 203 are parallel to each other and evenly distributed on the first surface 202. An angle θ defined by opposite sidewalls of each of the elongated V-shaped grooves 203 is in the range from about 45 degrees to about 90 degrees. A pitch P between adjacent elongated V-shaped grooves 203 is in the range from about 0.025 millimeters to about 1 millimeter. A ratio of brightness enhancement and a light emitting angle can be adjusted by adjusting the angle θ and the pitch P. In the illustrated embodiment, the angle θ is 60 degrees.

A plurality of parallelogram microstructures 207 arranged in a matrix manner is defined in the second surface 204. Four adjacent triangular pyramid depressions 205 are defined in each of the parallelogram microstructure 207.

The triangular pyramid depressions 205 are closely connected. In each of the parallelogram microstructure 207, the four triangular pyramid depressions 205 together with the sidewalls thereof cooperatively form a four-pointed star.

In the embodiment of FIG. 1, the sidewalls on each side of adjacent triangular pyramid depressions 205 sharing a same edge collectively to form a first V-shaped ridge aligned in a first direction $X_1$, a second V-shaped ridge aligned in a second direction $X_2$, a third V-shaped ridge aligned in a third direction $X_3$, and a fourth V-shaped ridge aligned in a fourth direction $X_4$.

The first, second, third, and fourth V-shaped ridges intersect one another and cooperatively define the triangular pyramid depressions 205. In other words, the first and third V-shaped ridges intersect one another and form a plurality of intersections. The second and the fourth V-shaped ridges respectively pass through the intersections of the first and the third ridges.

A first angle $\alpha_1$ is defined between the first direction $X_1$ and the second direction $X_2$. A second angle $\alpha_2$ is defined between the second direction $X_2$ and the third direction $X_3$. A third angle $\alpha_3$ is defined between the third direction $X_3$ and the fourth direction $X_4$. A fourth angle $\alpha_4$ is defined between the fourth direction $X_4$ and the first direction $X_1$. The first, second, third and fourth angles are all substantially 45 degrees.

A vertex angle of the first, second, third, and fourth V-shaped ridges taken along a plane perpendicular to an extending direction of the corresponding V-shaped ridge is in the range from substantially 80 degrees to substantially 100 degrees. A pitch of the adjacent V-shaped ridges aligned in the same direction is in the range from substantially 0.025 millimeters to substantially 1 millimeter. In the embodiment of FIG. 1, the relations of the first, second, third, and fourth V-shaped ridges are determined by the formula: $D_1=D_3=\sqrt{2}D_2=\sqrt{2}D_4$, where $D_1$ represents a pitch of adjacent first V-shaped ridges, $D_2$ represents a pitch of adjacent second V-shaped ridges, $D_3$ represents a pitch of adjacent third V-shaped ridges, and $D_4$ represents a pitch of adjacent fourth V-shaped ridges.

A thickness T of the sheet 20 is in the range from substantially 0.4 millimeters to substantially 4 millimeters. The prism sheet 20 may be made of a material selected from the group consisting of polycarbonate, polymethyl methacrylate, polystyrene, copolymer of methyl methacrylate and styrene, and any suitable combination of those.

The prism sheet 20 may be employed in a backlight module (not shown) such that the first surface 202 is facing the light source of the backlight module and the second surface 204 is away from the light sources. Light enters the prism sheet 20 via the first surface 202. Since the inner surfaces of the elongated V-shaped grooves 203 and the inner surfaces of the triangular pyramid depressions 205 are slanted, incident light that may have been internally reflected on a flat surface, are refracted, reflected, and diffracted. As a result, light outputted from the second surface 204 is more uniform than light outputted from a light output surface of a typical prism sheet, and strong light spots seldom occur. In addition, there is no need to add an extra upper light diffusion film between the prism sheet 20 and the liquid crystal display panel. Thus, the efficiency of light utilization is enhanced.

Referring to Table 1 below, the following test samples are provided.

TABLE 1

| Test samples | Condition |
| --- | --- |
| 1 | LED+ prism sheet 10 (shown in FIG. 4) |
| 2 | LED+ prism sheet 20 (shown in FIG. 5) |

Figure 4:
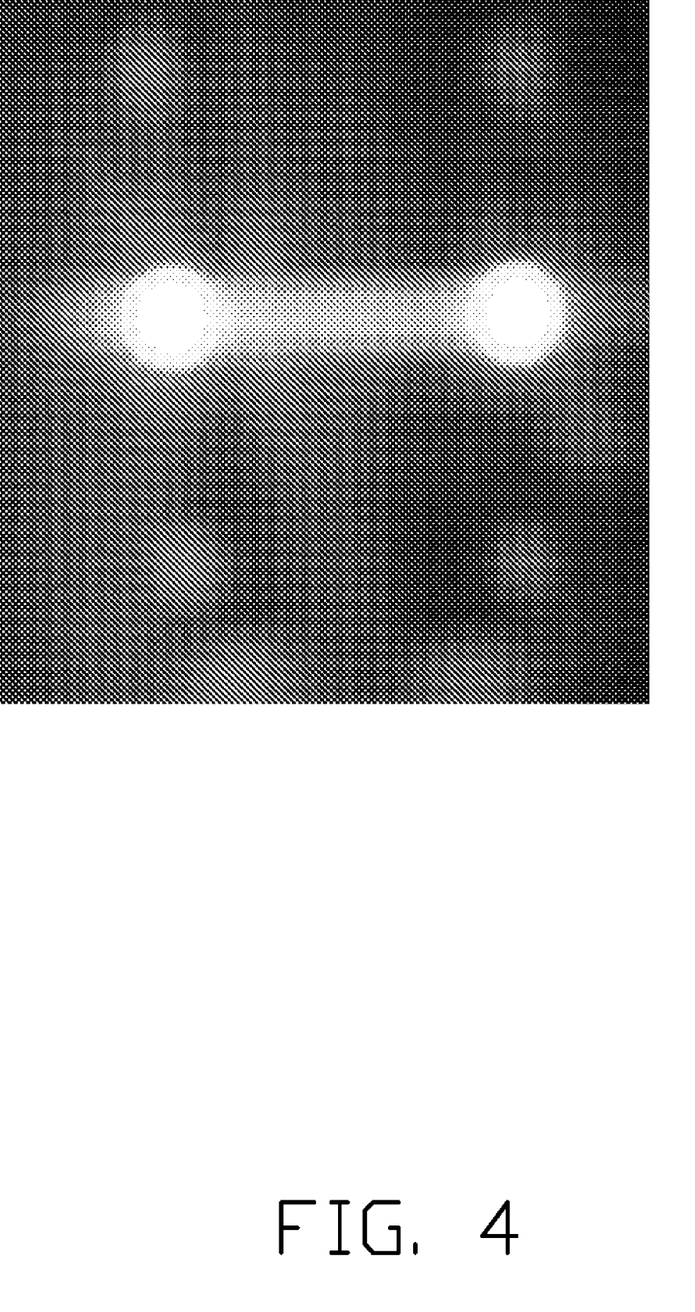
FIG. 4 is a photo showing an illumination distribution in a test of the backlight module using the typical prism sheet of FIG. 9.
Figure 5:
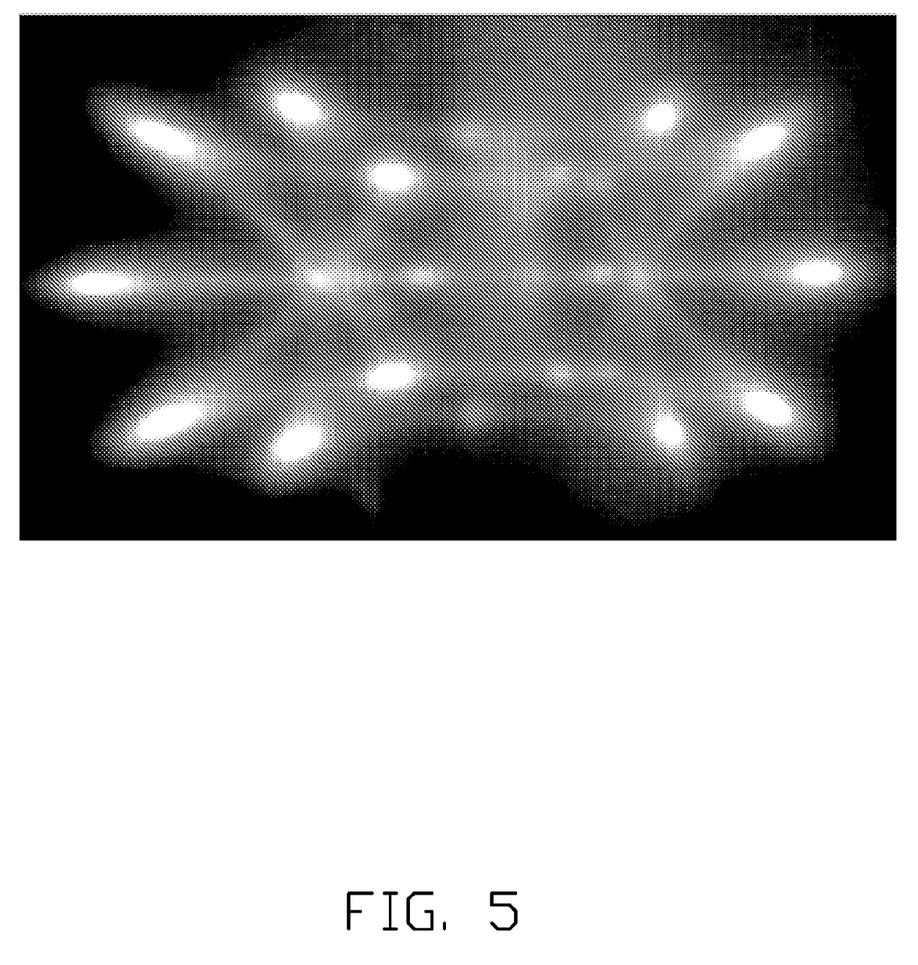
FIG. 5 is a photo showing an illumination distribution in a test of a backlight module using the prism sheet of FIG. 1.

Referring to FIGS. 4 and 5, test results from the test conditions in Table 1 shows light spots formed on the typical prism sheet 10 is relatively strong. In contrast, light spots formed on the prism sheet 20 is relatively weak. The test results show light emitting from the prism sheet 20 is more uniform. Therefore, when the prism sheet 20 is employed in a backlight module, strong light spots of the light sources seldom occur, more uniform light is achieved, and there is no need to add an upper light diffusion film positioned above the prism sheet 20. Thus, the efficiency of light utilization is enhanced.

In addition, because the triangular pyramid depressions 205 form the first, second, third, and fourth V-shaped ridges, light emitting from the second surface 204 would be concentrated in planes perpendicular to the first direction $X_1$, the second direction $X_2$, the third direction $X_3$, and the fourth direction $X_4$, thereby increasing the brightness of the prism sheet 10 along a direction perpendicular to the second surface 204.

In addition, in contrast to the typical prism sheet 10, the prism sheet 20 is integrally formed by injection molding technology, so the prism sheet 20 has a better rigidity and mechanical strength than the typical prism sheet 10 because the prism sheet 20 is integrally formed. Thus, the prism sheet 20 has a relatively high reliability.

Figure 6:
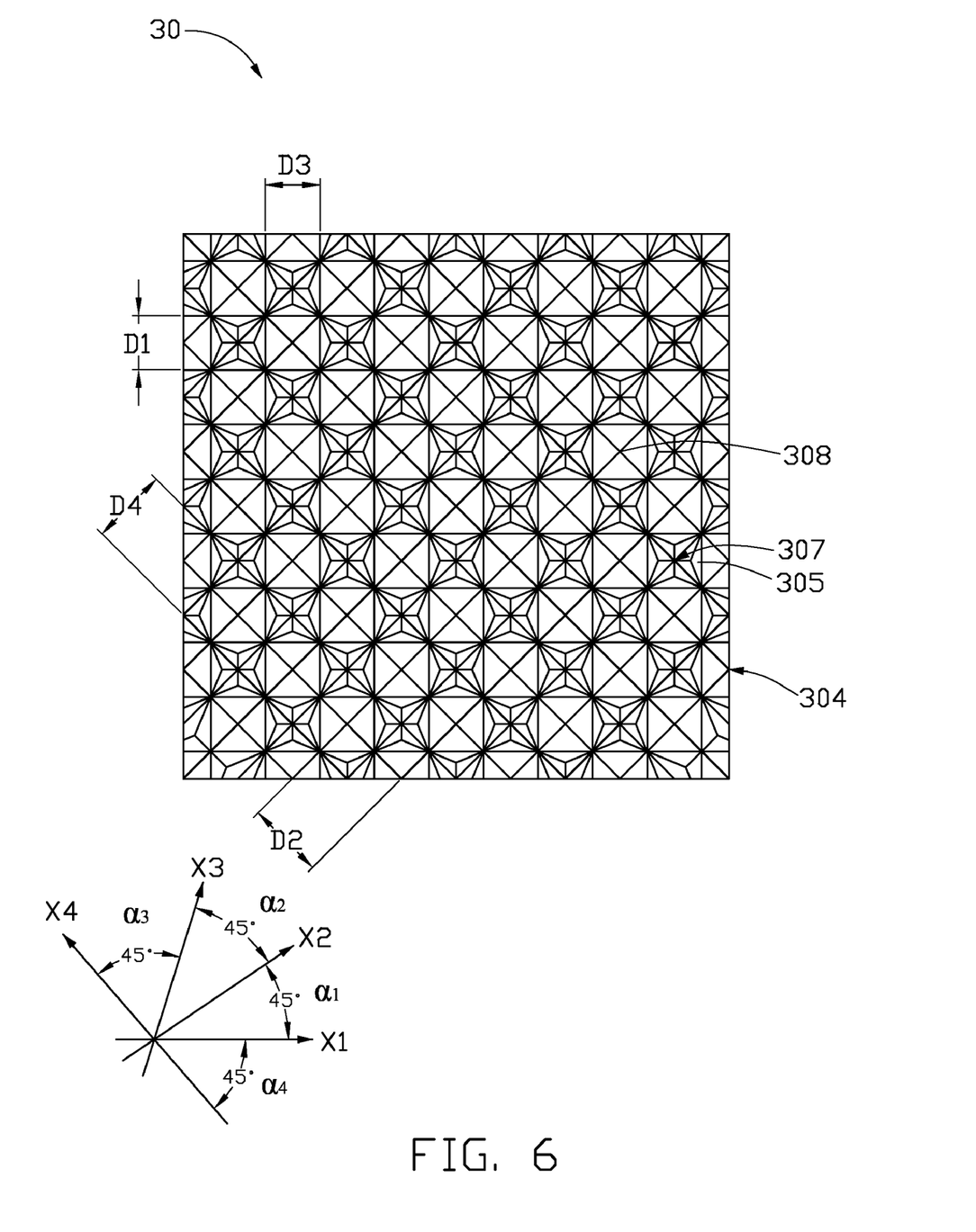
FIG. 6 is a top view of a second embodiment of a prism sheet.

Referring to FIG. 6, a second embodiment of a prism sheet 30 is shown. The prism sheet 30 is similar in principle to the first embodiment of the prism sheet 20. A plurality of parallelogram microstructures 307 is defined in the second surface 304, and each parallelogram microstructure 307 defines four adjacent triangular pyramid depressions 305. However, the prism sheet 30 also defines a plurality of quadrilateral pyramids 308. Each side of the parallelogram microstructures 307 is bordered with a side of a corresponding one of the quadrilateral pyramid 308. In other words, the first V-shaped ridges and the second V-shaped ridges intersect with each other and form a plurality of intersections, the third V-shaped ridges and the fourth V-shaped ridges respectively pass through the intersections of the first V-shaped ridges and the second V-shaped ridges at intervals. Pitches of adjacent V-shaped ridge of the four directions satisfy the following formula: $\sqrt{2}D_1=\sqrt{2}D_3=D_2=D_4$.

Figure 7:
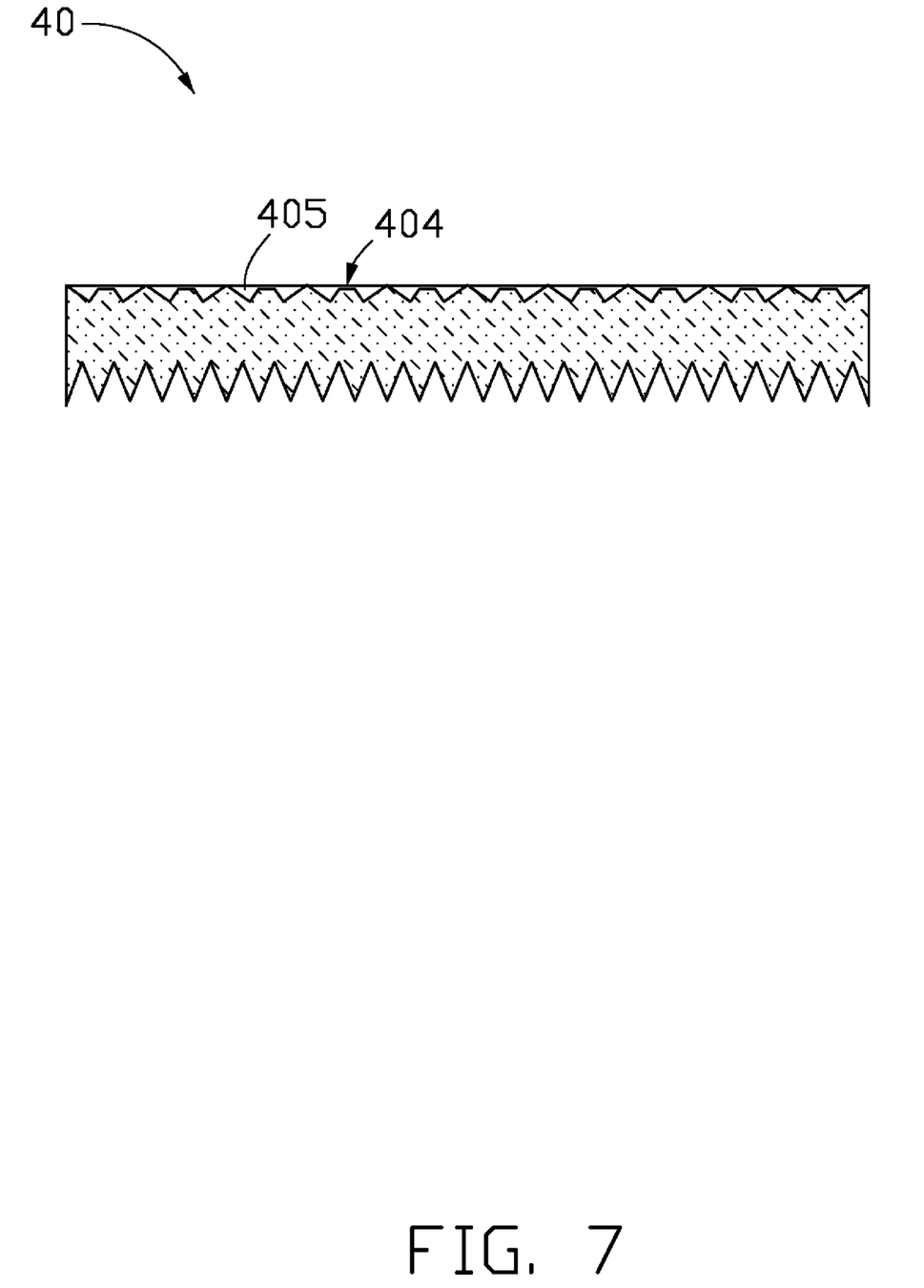
FIG. 7 is a cross-sectional view of a third embodiment of a prism sheet.

Referring to FIG. 7, a third embodiment of a prism sheet 40 is shown. The prism sheet 40 is similar in principle to the first embodiment of the prism sheet 20. The prism sheet 40 includes a first surface (not labeled) and a second surface 404. A plurality of the triangular pyramid depressions 405 are defined in the second surface 404. However top ends of a certain amount of the V-shaped ridges (not labeled) are flat. Since top ends of the V-shaped ridges are flat, the strength of the V-shaped ridges is enhanced. As a result, the prism sheet 40 would not be easily damaged during use.

Figure 8:
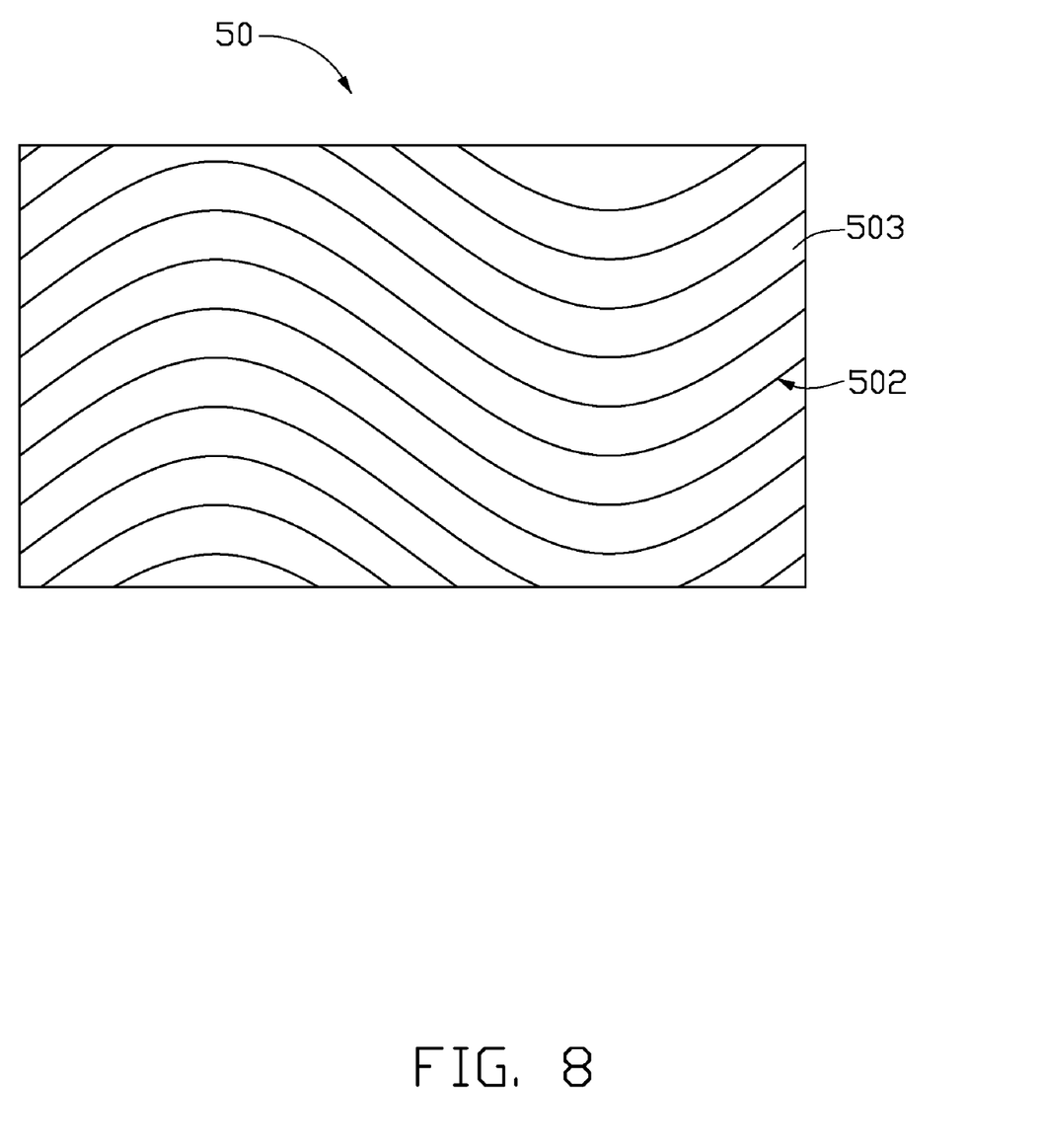
FIG. 8 is a bottom view of a fourth embodiment of a prism sheet

Referring to FIG. 8, a fourth embodiment of a prism sheet 50 is shown. The prism sheet 50 is similar in principle to the first embodiment of the prism sheet 20. The prism sheet 50 includes a first surface 502 and a second surface (not shown). A plurality of elongated V-shaped grooves 503 are defined on the first surface 502. However the elongated V-shaped grooves 503 extend along in a sinusoidal pattern. As a result, when the prism sheet 50 is employed in the display module, the matrix of the elongated V-shaped grooves 503 is different from the pixel matrix of the panel, so Morie Interference can be prevented.

While the embodiments have been described and illustrated, the invention is not to be construed as being limited thereto. Various modifications can be made to the embodiments by those of ordinary skilled in the art without departing from the true spirit and scope of the invention as defined by the appended claims.

What is claimed is:

1. A prism sheet comprising:
   a first surface comprising a plurality of elongated V-shaped grooves formed thereon; and
   a second surface opposite the first surface, wherein a plurality of parallelogram microstructures is defined on the second surface; each of the parallelogram microstructures define four adjacent triangular pyramid depressions.

2. The prism sheet of claim 1, wherein the elongated V-shaped grooves are parallel to each other.

3. The prism sheet of claim 1, wherein an angle defined by opposite sidewalls of each elongated V-shaped groove is in the range from 45 degrees to 90 degrees.

4. The prism sheet of claim 2, wherein a pitch between adjacent elongated V-shaped grooves is in a range from 0.025 millimeters to 1 millimeter.

5. The prism sheet of claim 2, wherein the elongated V-shaped grooves extend along the first surface in a sinusoidal pattern.

6. The prism sheet of claim 1, wherein each of the plurality of parallelogram microstructures is bordered by at least two other parallelogram microstructures of the plurality of parallelogram microstructures; sidewalls on each side of the adjacent triangular pyramid depressions sharing a same edge collectively form the plurality of V shaped ridges comprising a plurality of first V-shaped ridges aligned in a first direction, a plurality of second V-shaped ridges aligned in a second direction, a plurality of third V-shaped ridges aligned in a third direction, and a plurality of fourth V-shaped ridge aligned in a fourth direction; the first V-shaped ridges and the third V-shaped ridges intersect one another and form a plurality of intersections; each of the plurality of intersections intersect the second V-shaped ridges and the fourth V-shaped ridges.

7. The prism sheet of claim 6, wherein an angle defined between the first direction and the second direction, an angle defined between the second direction and the third direction, an angle defined between the third direction and the fourth direction, and an angle defined between the fourth direction and the first direction are substantially 45 degrees.

8. The prism sheet of claim 6, wherein a vertex angle of each of the V-shaped ridges is in the range from 80 degrees to 100 degrees.

9. The prism sheet of claim 6, wherein a top end of at least one V-shaped ridge is flat.

10. The prism sheet of claim 1, wherein a thickness of the prism sheet is in the range from 0.4 millimeters to 4 millimeters.

11. The prism sheet of claim 1, wherein the prism sheet is made of a material selected from the group consisting of polycarbonate, polymethyl methacrylate, polystyrene, copolymer of methylmethacrylate and styrene, and combinations thereof.

12. The prism sheet of claim 1, wherein the second surface further defines a plurality of quadrilateral pyramids, a side of each parallelogram microstructures borders with a side of one of the quadrilateral pyramids.

* * * * *